(12) United States Patent
Lin

(10) Patent No.: US 9,138,363 B1
(45) Date of Patent: Sep. 22, 2015

(54) WHEEL INDEPENDENT SUSPENSION SYSTEM FOR A MOBILITY SCOOTER

(71) Applicant: Chung-Chuan Lin, Taichung (TW)

(72) Inventor: Chung-Chuan Lin, Taichung (TW)

( * ) Notice: Subject to any disclaimer, the term of this patent is extended or adjusted under 35 U.S.C. 154(b) by 0 days.

(21) Appl. No.: 14/244,895

(22) Filed: Apr. 4, 2014

(51) Int. Cl.
*B60G 3/12* (2006.01)
*A61G 5/10* (2006.01)
*B60G 3/14* (2006.01)
*B60G 11/24* (2006.01)
*B62K 5/007* (2013.01)

(52) U.S. Cl.
CPC .. *A61G 5/10* (2013.01); *B60G 3/14* (2013.01); *B60G 11/24* (2013.01); *B62K 5/007* (2013.01); *A61G 2005/1078* (2013.01)

(58) Field of Classification Search
USPC ............... 280/124.128, 124.13, 124.166, 280/124.169; 267/219, 273, 279
See application file for complete search history.

(56) References Cited

U.S. PATENT DOCUMENTS

| | | | | |
|---|---|---|---|---|
| 3,706,481 | A * | 12/1972 | Kramer | 305/134 |
| 4,744,588 | A * | 5/1988 | Wharton | 280/124.13 |
| 5,277,450 | A * | 1/1994 | Henschen | 280/6.151 |
| 5,326,128 | A * | 7/1994 | Cromley, Jr. | 280/656 |
| 8,191,911 | B1 * | 6/2012 | Reynolds | 280/124.166 |
| 8,360,448 | B2 * | 1/2013 | Lariviere | 280/86.75 |
| 8,573,621 | B1 * | 11/2013 | Reynolds | 280/124.166 |
| 2005/0127632 | A1 * | 6/2005 | Gehret | 280/124.13 |
| 2009/0278328 | A1 * | 11/2009 | VanDenberg et al. | 280/124.13 |

* cited by examiner

*Primary Examiner* — Toan To
(74) *Attorney, Agent, or Firm* — Patent Office of Bang Shia

(57) ABSTRACT

A wheel independent suspension system for a mobility scooter includes: a chassis, and front wheels and rear wheels. A rail is disposed at the rear end of the chassis and extends along a width direction of the chassis, two ends of the rail are each connected to a first shock absorber which includes a rectangular inner and outer rectangular inner pipe disposed in and rotated 45 degrees with respect to the outer pipe, the edges of the inner pipe are abutted against an inner surface of the outer pipe, between each of the edges of the inner pipe and the inner space of the outer pipe is disposed an elastic rubber, the rail is rectangular and inserted in the inner pipe, two first connecting sleeves are sleeved onto the outer pipe and each provided with a connecting rod to which are connected the rear wheels.

5 Claims, 6 Drawing Sheets

US 9,138,363 B1

WHEEL INDEPENDENT SUSPENSION SYSTEM FOR A MOBILITY SCOOTER

BACKGROUND OF THE INVENTION

1. Field of the Invention

The present invention relates to a mobility assistant device, and more particularly to a wheel independent suspension system for a mobility scooter.

2. Description of the Prior Art

Mobility scooters are environment friendly mobility aids which are very suitable for elders, disabled people and middle aged people and can get people any place they want. For example, people can use it when going to a garden, shopping around, or dropping off and picking up child. However, the road surface that the mobility scooter runs is never always smooth. Therefore, to enhance sitting comfort, the mobility scooters must be equipped with shock absorbers which normally are in the form of a spring disposed between the seat and the chassis. However, the shock absorbing effect of the spring is not good since it only works in the height direction. Besides, the spring shock absorber is complicated in structure, costly to assemble, and requires a certain amount of height, which is not conducive to miniaturization of the mobility scooter.

The present invention has arisen to mitigate and/or obviate the afore-described disadvantages.

SUMMARY OF THE INVENTION

The primary objective of the present invention is to provide a wheel independent suspension system for a mobility scooter, wherein all wheels can be independently suspended from the chassis to improve shock absorbing effect.

To achieve the above objective, a wheel independent suspension system for a mobility scooter comprises: a chassis, and front wheels and rear wheels at front and rear ends of the chassis, the wheel independent suspension system is characterized in that: a rail is disposed at the rear end of the chassis and extends along a width direction of the chassis, each of two ends of the rail is connected to a first shock absorber which includes a rectangular outer pipe, and a rectangular inner pipe disposed in and rotated degrees with respect to the outer pipe, so that edges of the inner pipe are abutted against an inner surface of the outer pipe, between each of the edges of the inner pipe and the inner space of the outer pipe is disposed an elastic rubber, the rail has a rectangular cross section and is inserted in the inner pipe, two first connecting sleeves are sleeved onto the outer pipe and each provided with a connecting rod to which are connected the rear wheels, so that the rear wheels are independently suspended from the chassis via the first connecting sleeves and the first shock absorbers.

Preferably, the rail is provided with positioning pieces which are located at both ends of the respective first shock absorbers in such a manner that the positioning pieces located between the first shock absorbers are welded to the rail, and the positioning pieces located outside the first shock absorbers are fixed by bolts.

Preferably, a second connecting sleeve which is a square pipe extending in the width direction of the chassis is provided at each of two sides of the front end of the chassis, in each of the second connecting sleeves is disposed a second shock absorber which is structurally the same as the first shock absorbers, at two ends of the inner pipe of the respective second shock absorbers are fixed two suspension arms which are connected to a shaft, respectively, each of the shafts is provided with a first connecting arm extending in the width direction of the chassis, the front wheels are connected to the first connecting arms and pivoted to the suspension arms via the shafts, on each of the shafts is provided a second connecting arm which extends upward and is hinged with a third connecting arm extending in the width direction of and hinged to the chassis, and the front wheels are independently suspended from the chassis via the second shock absorbers and the suspension arms.

Preferably, a square pipe is inserted in the inner pipe of the respective second shock absorbers and is to be engaged in a square cavity formed in each of the suspension arms, then a bolt is inserted through the corresponding suspension arm and screwed with a nut, so as to fix the suspension arm to the square pipe.

Preferably, each of the third connecting arms has two ends hinged to the chassis and a corresponding one of the second connecting arms by a universal rotation means.

With the first connecting sleeves 6 and the first shock absorbers, each of the rear wheels can be independently suspended from the chassis, unlike the conventional suspension, in which springs are disposed between the seat and the chassis. When the rear wheels run on a pump road surface, the first shock absorbers will bounce up and down together with the rear wheels to reduce shock transmission between the rear wheels and the chassis, preventing shock from being transmitted to the seat via the chassis, so that the user on the seat will feel less shock. Besides, the structure of the first shock absorbers can produce shock absorbing effect in all directions, unlike the springs that produce shock absorbing effect only in the vertical direction. The first shock absorbers also take much less space than the springs, which is conducive to miniaturization of the mobility scooter.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
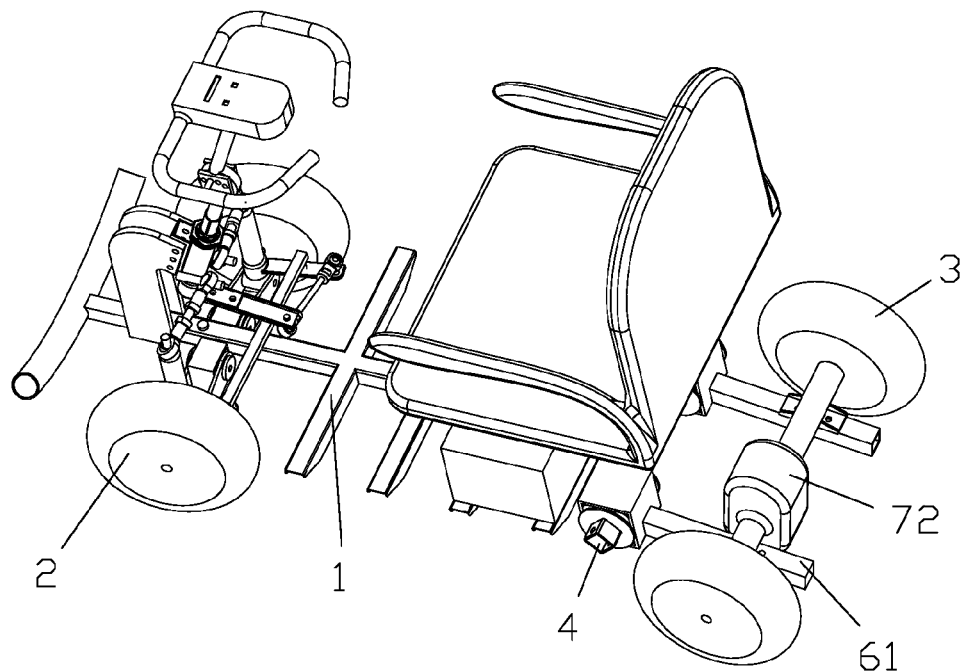
FIG. 1 is an illustrative view of a wheel independent suspension system for a mobility scooter in accordance with the present invention.
Figure 2:
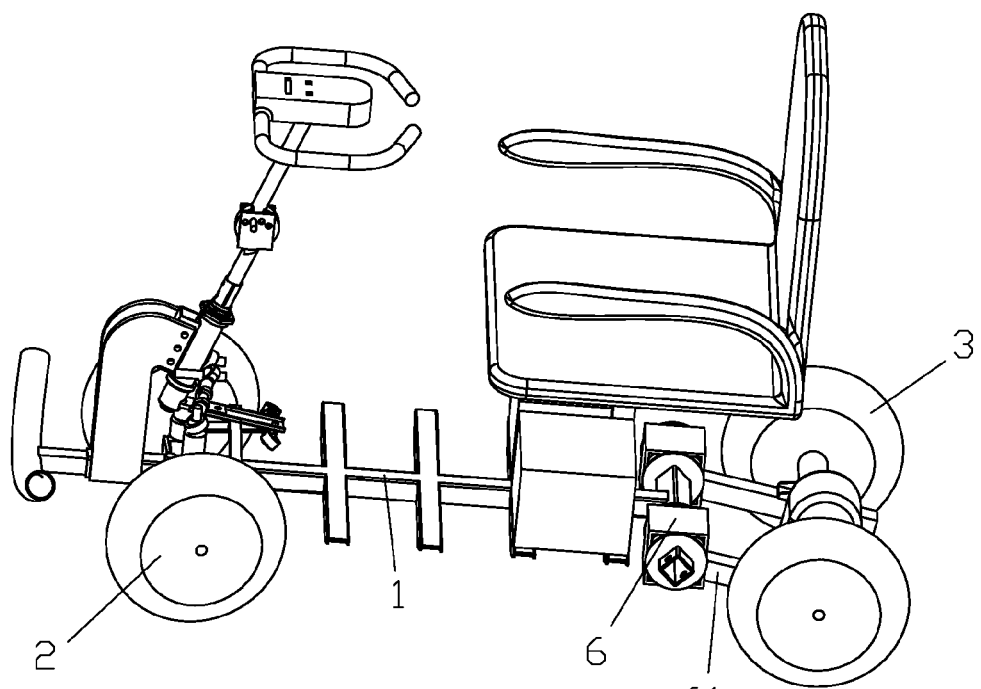
FIG. 2 is another illustrative view of the wheel independent suspension system for a mobility scooter in accordance with the present invention.
Figure 3:
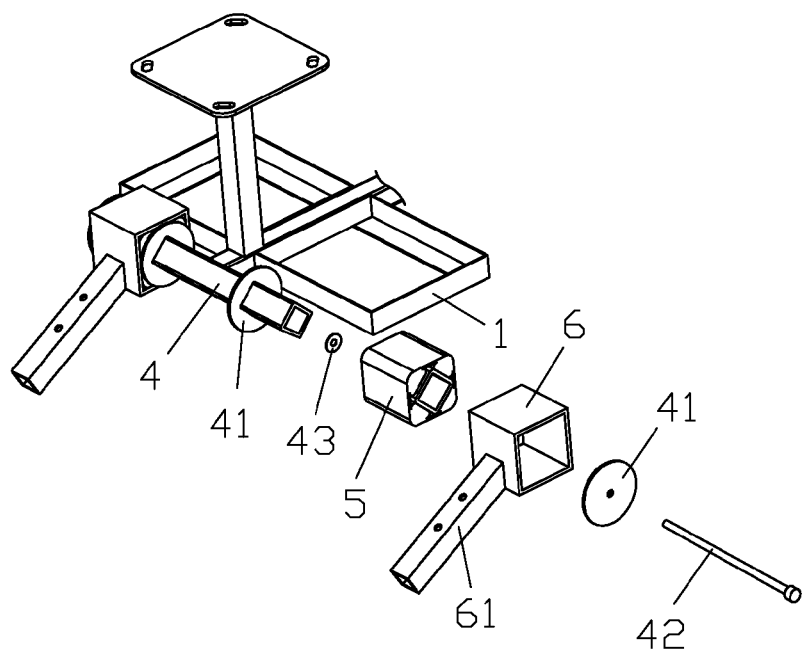
FIG. 3 is an exploded view of a part of the illustrative view of the wheel independent suspension system for a mobility scooter in accordance with the present invention.
Figure 4:
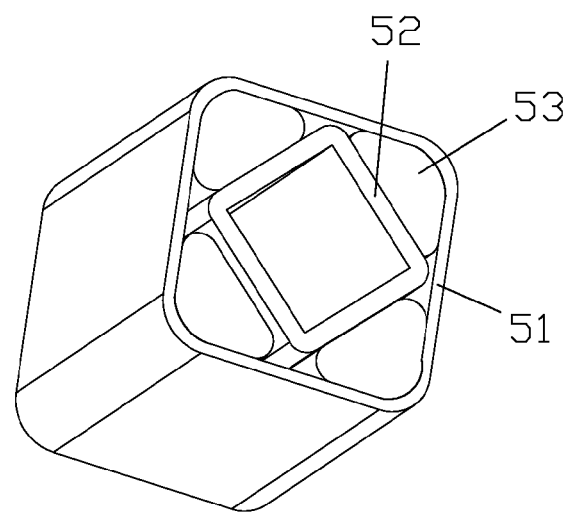
FIG. 4 shows a shock absorber of the wheel independent suspension system for a mobility scooter in accordance with the present invention.
Figure 5:
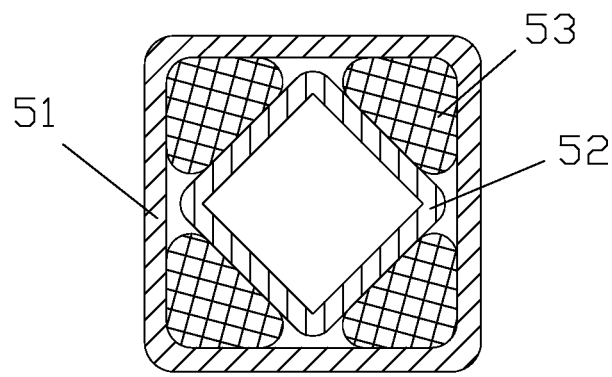
FIG. 5 is a cross sectional view of FIG. 4.
Figure 6:
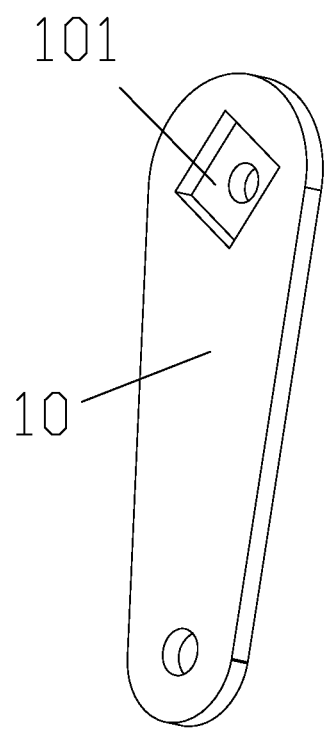
FIG. 6 shows a suspension arm of the wheel independent suspension system for a mobility scooter in accordance with the present invention.
Figure 7:
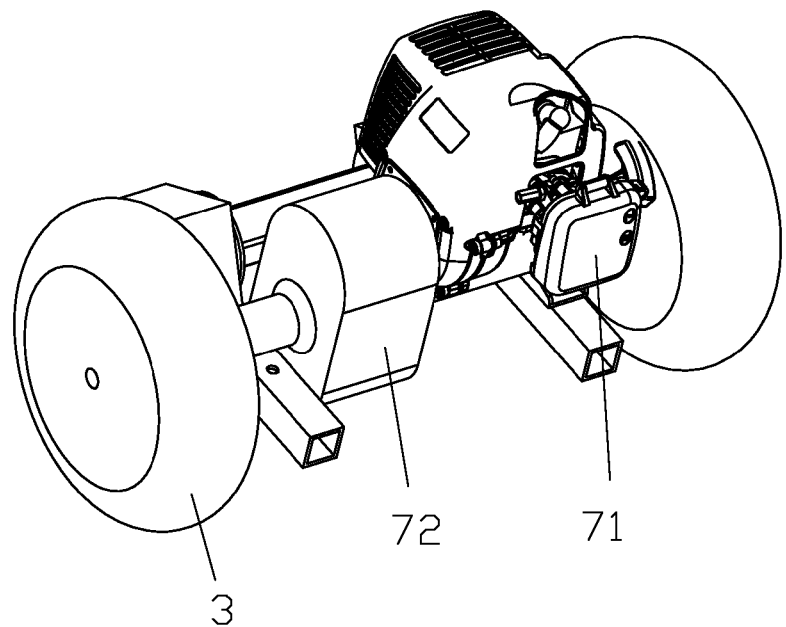
FIG. 7 shows that the rear axle of the present invention is equipped with a gasoline engine.
Figure 8:
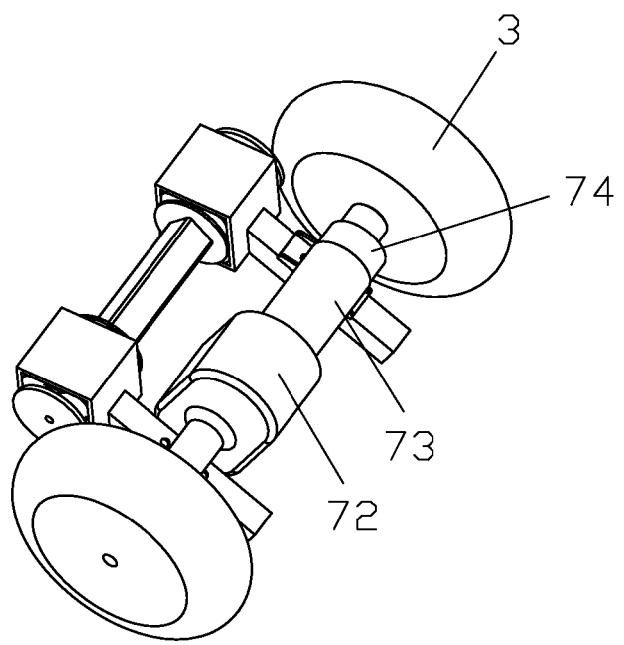
FIG. 8 shows that the rear axle of the present invention is equipped with an electric drive motor.
Figure 9:
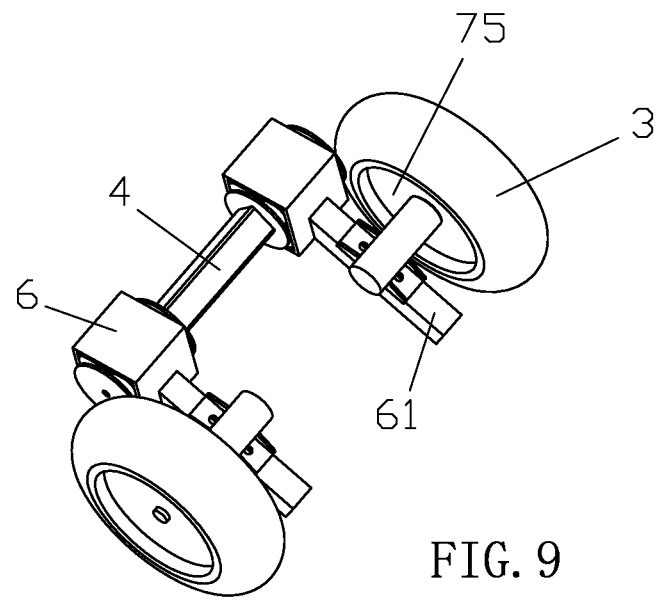
FIG. 9 shows that the rear axle of the present invention is equipped with a but motor.
Figure 10:
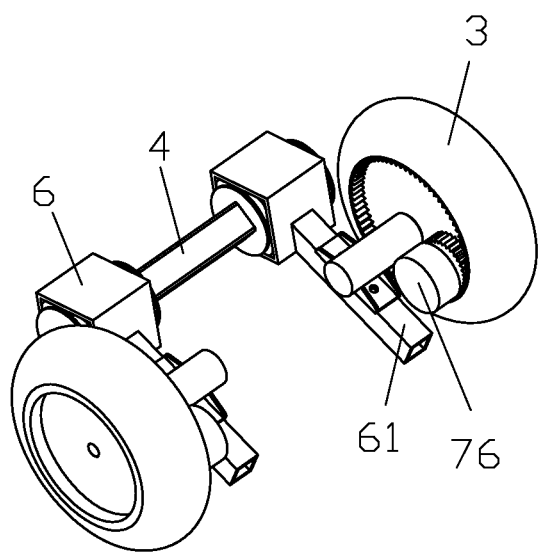
FIG. 10 shows that the rear axle of the present invention is equipped with a motor gear.
Figure 11:
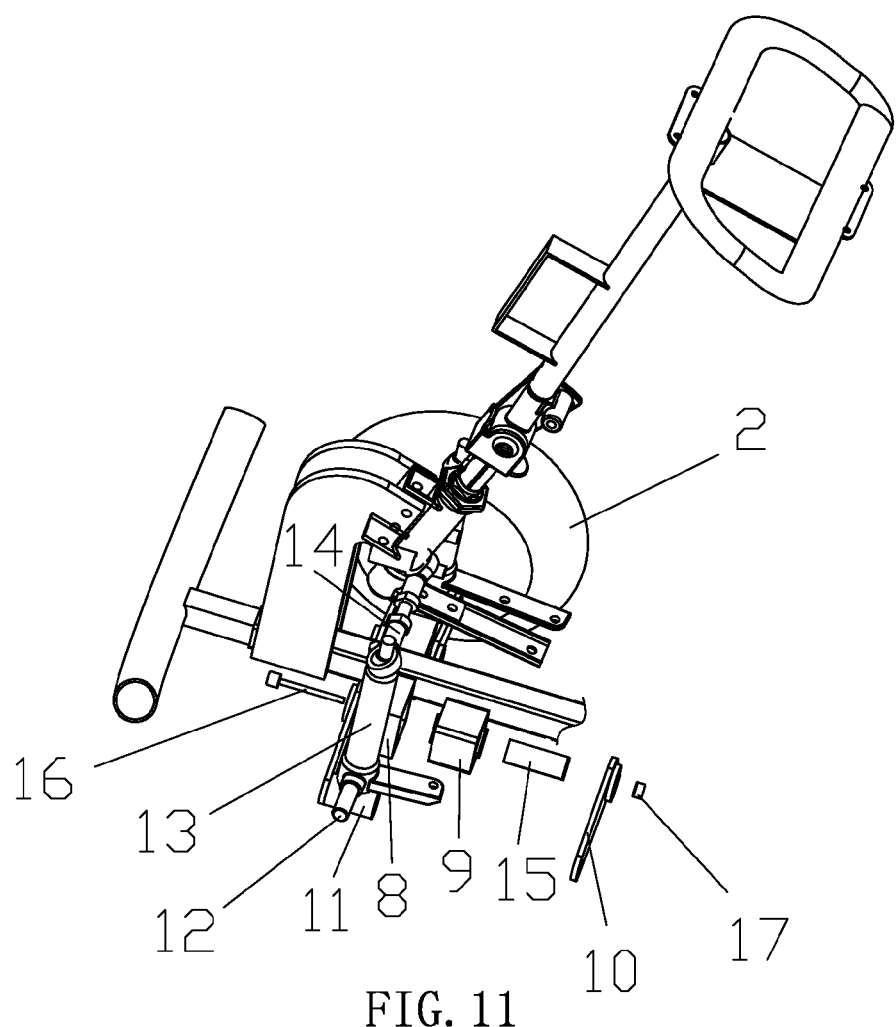
FIG. 11 is an exploded view of the front wheel suspension of the present invention.

Referring to FIGS. 1-12, a wheel independent suspension system for a mobility scooter in accordance with the present invention comprises a chassis 1. The mobility scooter is provided with front wheels 2 and rear wheels 3 at the front and rear ends of the chassis 1. A rail 4 is disposed at the rear end of the chassis 1 and extends along the width direction of the chassis 1. The rail 4 can be welded to or integral with the chassis 1. Each of two ends of the rail 4 is connected to a first shock absorber 5 which includes a rectangular outer pipe 51, and a rectangular inner pipe 52 disposed in and rotated 45 degrees with respect to the outer pipe 51, so that the edges of the inner pipe 52 are abutted against the inner surface of the outer pipe 51. Between each of the edges of the inner pipe 52 and the inner space of the outer pipe 51 is disposed an elastic rubber 53. The rail 4 has a rectangular cross section and is inserted in the inner pipe 52. Two first connecting sleeves 6 are sleeved onto the outer pipe 51 and each provided with a connecting rod 61 to which are connected the rear wheels 3, so that the rear wheels 3 are independently suspended from the chassis 1 via the first connecting sleeves 6 and the first shock absorbers 5. The rear wheels 3 can be driven to rotate by a gasoline engine 71, as shown in FIG. 7, wherein the rear axle is equipped with a gearbox 72, or by an electric drive motor 73 as shown in FIG. 8, wherein the rear axle is equipped with the gearbox 72 and an electromagnetic brake 74, or rear wheels 3 can be driven to rotate by a hub motor 75 as shown in FIG. 9, or by a motor gear 76 as shown in FIG. 10, wherein the motor can be brush or brushless motor.

In this embodiment, the rail 4 is provided with four positioning pieces 41 which are located at both ends of the respective first shock absorbers 5 in such a manner that the positioning pieces 41 located between the first shock absorbers 5 are welded to the rail 4, and the positioning pieces 41 located outside the first shock absorbers 5 are fixed by bolts 42. Inside the rail 4 are welded fixing members 43 with inner thread for mating with the bolts 42, so as to restrict the axial movement of the first shock absorbers 5 with respect to the rail 4.

The abovementioned rear wheel independent suspension system is applicable to three-wheel or four-wheel mobility scooter. As for a four-wheel mobility scooter, all the four wheels can be independently suspended from the chassis in order to improve shock absorbing effect. In this embodiment, at each of two sides of the front end of the chassis 1 is provided a second connecting sleeve 8 which is a square pipe extending in the width direction of the chassis 1. In each of the second connecting sleeves 8 is disposed a second shock absorber 9 which is structurally the same as the first shock absorbers 5. At two ends of the inner pipe of the respective second shock absorbers 9 are fixed two suspension arms 10 which are connected to a shaft 11, respectively. Each of the shafts 11 is provided with a first connecting arm 12 extending in the width direction of the chassis 1. The front wheels 2 are connected to the first connecting arms 12 and pivoted to the suspension arms 10 via the shafts 11. When the mobility scooter runs on a bumpy road surface, the suspension arms 10 can bounce up and down because of the second shock absorbers 9, and the shafts 11 can prevent the front wheels 2 from being inclined due to the up and down bouncing of the suspension arms 10, ensuring that all the front wheels 2 stand vertically on the road surface. To prevent arbitrary sway of the shafts 11 with respect to the suspension arms 10, on each of the shafts 11 is provided a second connecting arm 13 which extends upward and is hinged with a third connecting arm 14 extending in the width direction of and hinged to the chassis 1. By such arrangements, the chassis 1, the suspension arms 10, the second and third connecting arms 13, 14 form a quadrangular balancing mechanism, which allows the front wheels 2 to move up and down with respect to the chassis 1 along with the suspension arms 10, so as to provide a shock absorbing effect. Furthermore, the shafts 11 can be prevented from undesired swinging, and the front wheels 2 are independently suspended from the chassis 1 via the second shock absorbers 9 and the suspension arms 10.

Figure 12:
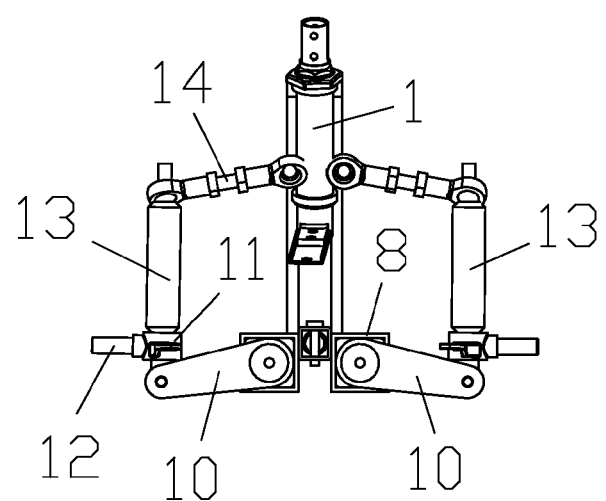
FIG. 12 shows that the chassis, the suspension arms, the second and third suspension arms form a quadrangular balancing mechanism.

In this embodiment, each of the third connecting arms 14 has two ends hinged to the chassis 1 and a corresponding one of the second connecting arms 13 by a universal rotation means. The universal rotation means is shown in FIG. 12, or can also be a general hinge shaft.

To assemble the suspension arms 10, in the inner pipe of the respective second shock absorbers 9 is inserted a square pipe 15 which is to be engaged in a square cavity 101 formed in each of the suspension arms 10, then a bolt 16 I is inserted through the corresponding suspension arm 10 and screwed with a nut 17, so as to fix the suspension arm 10 to the square pipe 15. Or, without the square pipe 15, the suspension arm 10 can also be fixed to the corresponding one of the second absorbers 9, wherein the inner pipe of the second absorber 9 protrudes out of the outer pipe, so that the square cavity 101 of the suspension arm 10 can be directly engaged with the inner pipe of the second absorber 9.

With the first connecting sleeves 6 and the first shock absorbers 5, each of the rear wheels 3 can be independently suspended from the chassis 1, unlike the conventional suspension, in which springs are disposed between the seat and the chassis. When the rear wheels 3 run on a pump road surface, the first shock absorbers 5 will bounce up and down together with the rear wheels 3 to reduce shock transmission between the rear wheels 3 and the chassis 1, preventing shock from being transmitted to the seat via the chassis 1, so that the user on the seat will feel less shock. Besides, the structure of the first shock absorbers 5 can produce shock absorbing effect in all directions, unlike the springs that produce shock absorbing effect only in the vertical direction. The first shock absorbers 5 also take much less space than the springs, which is conducive to miniaturization of the mobility scooter.

While we have shown and described various embodiments in accordance with the present invention, it is clear to those skilled in the art that further embodiments may be made without departing from the scope of the present invention.

What is claimed is:

1. A wheel independent suspension system for a mobility scooter comprising: a chassis, and front wheels and rear wheels at front and rear ends of the chassis, the wheel independent suspension system being characterized in that: a rail is disposed at the rear end of the chassis and extends along a width direction of the chassis, each of two ends of the rail is connected to a first shock absorber which includes a rectangular outer pipe, and a rectangular inner pipe disposed in and rotated degrees with respect to the outer pipe, so that edges of the inner pipe are abutted against an inner surface of the outer pipe, between each of the edges of the inner pipe and the inner space of the outer pipe is disposed an elastic rubber, the rail has a rectangular cross section and is inserted in the inner pipe, two first connecting sleeves are sleeved onto the outer pipe and each provided with a connecting rod to which are connected the rear wheels, so that the rear wheels are independently suspended from the chassis via the first connecting sleeves and the first shock absorbers.

2. The wheel independent suspension system for the mobility scooter as claimed in claim 1, wherein the rail is provided with positioning pieces which are located at both ends of the respective first shock absorbers in such a manner that the positioning pieces located between the first shock absorbers are welded to the rail, and the positioning pieces located outside the first shock absorbers are fixed by bolts.

3. The wheel independent suspension system for the mobility scooter as claimed in claim 1, wherein a second connecting sleeve which is a square pipe extending in the width direction of the chassis is provided at each of two sides of the front end of the chassis, in each of the second connecting sleeves is disposed a second shock absorber which is structurally the same as the first shock absorbers, at two ends of the inner pipe of the respective second shock absorbers are fixed two suspension arms which are connected to a shaft, respectively, each of the shafts is provided with a first connecting arm extending in the width direction of the chassis, the front wheels are connected to the first connecting arms and pivoted to the suspension arms via the shafts, on each of the shafts is provided a second connecting arm which extends upward and is hinged with a third connecting arm extending in the width direction of and hinged to the chassis, and the front wheels are independently suspended from the chassis via the second shock absorbers and the suspension arms.

4. The wheel independent suspension system for the mobility scooter as claimed in claim 3, wherein a square pipe is inserted in the inner pipe of the respective second shock absorbers and is to be engaged in a square cavity formed in each of the suspension arms, then a bolt is inserted through the corresponding suspension arm and screwed with a nut, so as to fix the suspension arm to the square pipe.

5. The wheel independent suspension system for the mobility scooter as claimed in claim 3, wherein each of the third connecting arms has two ends hinged to the chassis and a corresponding one of the second connecting arms by a universal rotation means.

\* \* \* \* \*